US005796925A

United States Patent [19]

Deville

[11] Patent Number: 5,796,925
[45] Date of Patent: Aug. 18, 1998

[54] NEURAL DIGITAL PROCESSOR UTILIZING AN APPROXIMATION OF A NON-LINEAR ACTIVATION FUNCTION

[75] Inventor: Yannick Deville, Villescresnes, France

[73] Assignee: U.S. Philips Corporation, New York, N.Y.

[21] Appl. No.: 384,191

[22] Filed: Feb. 6, 1995

Related U.S. Application Data

[63] Continuation of Ser. No. 980,829, Nov. 24, 1992, abandoned.

[30] Foreign Application Priority Data

Dec. 11, 1991 [FR] France ..................... 91 15373

[51] Int. Cl.⁶ ..................................... G06F 15/18
[52] U.S. Cl. ................... 395/27; 395/23; 395/24
[58] Field of Search ..................... 395/27, 23, 24

[56] References Cited

U.S. PATENT DOCUMENTS

| | | | |
|---|---|---|---|
| 3,601,811 | 8/1971 | Yoshino | 395/27 |
| 4,979,126 | 12/1990 | Pao et al. | 395/27 |
| 4,994,982 | 2/1991 | Duranton et al. | 395/27 |
| 5,005,206 | 4/1991 | Naillon et al. | 395/22 |
| 5,067,095 | 11/1991 | Peterson et al. | 395/24 |
| 5,097,141 | 3/1992 | Leivian et al. | 395/27 |
| 5,107,442 | 4/1992 | Weideman | 395/24 |
| 5,109,351 | 4/1992 | Simar, Jr. | 395/27 |
| 5,131,072 | 7/1992 | Yoshizawa et al. | 395/24 |
| 5,228,113 | 7/1993 | Shelton | 395/23 |
| 5,293,459 | 3/1994 | Duranto et al. | 395/27 |
| 5,369,731 | 11/1994 | Masumoto et al. | 395/24 |
| 5,455,893 | 10/1995 | Sirat | 395/27 |
| 5,517,598 | 5/1996 | Sirat | 395/27 |

FOREIGN PATENT DOCUMENTS 2236608  4/1991  United Kingdom.

OTHER PUBLICATIONS

C. Alippi et al., "Simple Approximation of Signmoidal Functions: Realistic Design of Digital Neural Networks Capable of Learning", 1991 IEEE International Symposium on Circuits and Systems, Jun. 11–14, 1991, vol. 3, pp. 1505–1508.

Martinez et al, "Digital Neural Networks", Proceedings of the 1988 IEEE. Inter. Conf. on Systems, Man and Cybernetics, Aug. 8–12, 1988.

*Primary Examiner*—George B. Davis
*Attorney, Agent, or Firm*—Anne E. Barschall

[57] ABSTRACT

A neural digital processor (10) that includes circuitry (14) for applying a function ANLF to neural potentials. ANLF approximates a non-linear activation function NLF. The circuitry includes another neural processor which operates with another non-linear activation function CNLF. CNLF is a simple function, for example a ramp. The circuitry (14) may comprise elements ($36_1$, $36_2$, 64) in common with apparatus (75) for calculating a derivative of the approximation function ANLF. The precision of approximation of the non-linear activation function NLF can be predetermined.

17 Claims, 5 Drawing Sheets

NEURAL DIGITAL PROCESSOR UTILIZING AN APPROXIMATION OF A NON-LINEAR ACTIVATION FUNCTION

This is a continuation of application Ser. No. 07/980,829, filed on Nov. 24, 1992, now abandoned.

FIELD OF THE INVENTION

The invention relates to a neural digital processor, comprising:

first input means for digital data, a neural unit which calculates neural potentials according to a function of input data and synaptic coefficients which relate to connections either between neurons themselves or between neurons and the input means, second means for storing said synaptic coefficients, third means for subjecting at least one neural potential POT to at least one approximative non-linear activation function ANLF which is formed by n segments in order to produce at least one neural state STAT.

The invention relates further to non-linear controllers and to creating a non-linear transfer function for such a controller.

BACKGROUND OF THE INVENTION

A neural digital processor forms part of a complete system known as a neural network. Neural networks are used for classification problems, notably for the recognition of shapes, characters, for signal processing, speech processing, image processing, or for the compression of information.

Neural networks are formed by non-linear automatic devices which are generally interconnected by synapses whereto synaptic coefficients are assigned. They enable the solving of problems which are difficult to solve by means of the conventional sequential computers.

The two most common types of network are:

the fully connected networks which are referred to as Hopfield networks, the layered networks: the neurons are grouped in successive layers, each neuron being connected to all neurons of the next layer, the information proceeding from the input layer to the subsequent layers (hidden layers) until it reaches the output layer.

These systems are capable of learning by example or of organizing themselves. The very long calculation times in a sequentional computer can be substantially reduced by executing the operations in parallel, which operations comprise learning phases and resolving phases.

In order to perform a given treatment, the neural networks must learn in advance how to carry out this operation. This phase is referred to as the learning phase and utilizes examples. For many algorithms, the results to be obtained at the output on the basis of these examples are generally known in advance. Initially, the neural network has not yet been adapted to the desired task and delivers incorrect results. An error is then determined between the results obtained and the results which should have been obtained and, on the basis of an adaptation criterion, the synaptic coefficients are modified in order to allow the neural network to learn the chosen example. This step is repeated for all examples considered necessary for satisfactory learning by the neural network.

There are two categories of learning algorithms:

local learning where the modification of a synaptic coefficient $C_{ab}$ connecting a neuron "b" to a neuron "a" depends only on the information provided by the neurons "a" and "b", non-local learning where the modification depends on information present throughout the network. The latter learning is, for example, that by error backpropagation in layered networks.

A given neuron thus sums the set of contributions made by the neurons connected upstream thereof. It then supplies a neuron potential POT. At the output, there may be provided one or more neurons which are referred to as output neurons. The neural potentials POT of the neurons should generally be subjected to a non-linear activation function NLF in order that the processor can correctly take decisions. This activation function NLF should satisfy given criteria, the most important of which are that it should saturate when the absolute value of the variable increases and that it should be possible to calculate its derivative at any point.

Several activation functions are currently used in known neural processors. The functions which are most common are the sigmoid functions, because these functions enable optimum results to be obtained, notably as regards the speed of convergence during learning steps, necessary, for example, to adapt the neural processor to the desired application.

Various methods are known at present for subjecting the neural potentials POT to the non-linear activation function NLF. These methods utilize an operation which is either internal or external of the processor. The external operation may be performed by means of a calculator or by the reading of precalculated tables. The calculation precision for the synaptic coefficients (during the learning phase) or the neural states (during the resolving phase) ultimately depends on the calculation step performed either in the calculator or in the precalculated tables. Thus, limits exist as regards the size, notably for the precalculated tables, or the duration of calculation for the calculators.

Moreover, a reconfiguration of the tables for operation with other activation functions has been shown to be a slow process. It is no longer possible to easily vary the parameter T, referred to as the "temperature" parameter which renders the activation function F(x/T) modifiable. Moreover, the calculation of an activation function and its derivative constitute two distinct operations.

Moreover, any external operation necessitates the extraction of initial digital data (neural potentials POT) from the neural processor, followed by the re-introduction of processed digital data (neural states STAT) into the neural processor. These operations require processing time and transfer time, as well as specific hardware, which is preferably avoided for implementations in the form of an integrated circuit.

Therefore, the aim has been to integrate the calculation means directly in the neural processor, enabling the application of the selected non-linear activation function. If a hardware reduction is desired for the implementation of the non-linear function, a restriction thus exists in that only simple non-linear functions can be utilized. It has been found that these readily become inadequate for contemporary applications.

As it is not very feasible to perform the calculation of a sigmoid function with a sufficiently small step, the approach is now towards the approximation of the sigmoid function by a piecewise-linear function. For example, the document GB 2 236 608 A describes a digital neural network which comprises means for calculating an approximative non-linear function which is formed by a piecewise-linear function. The principle consists in the application of a compression law of the type A with pulse code modulation.

However, as the cited document already states, the approximation thus obtained remains imperfect and could lead to errors in the operation of the neural processor. Therefore, it is desirable to obtain a much stricter approximation of the sigmoid function. It may also be desirable that the implementation of the approximative non-linear function can be readily reprogrammed in order to approximate functions other than sigmoid functions. This updating should be quickly performed. In addition, it should be possible to modify the temperature of the non-linear function, as introduced above, very quickly.

On the other hand, during learning phases it is possible to utilize learning algorithms which necessitate calculation of the derivative of the approximative non-linear function used. Therefore, it is also desirable for the hardware to be capable of performing also this mode of operation at low cost.

SUMMARY OF THE INVENTION

Thus, for the calculation of the results of the application of said approximative non-linear activation function ANLF to said neural potential POT, in accordance with the invention the third means comprise another neural digital processor which comprises:

- means for calculating n combinations $M_j=H_j \cdot POT+Th_j$, where $H_j$ are predetermined synaptic coefficients with $1 \leq j \leq n$ and $Th_j$ are thresholds,

- means for calculating applications $S_j=F(M_j)$ of at least one other non-linear function CNLF to the combinations $M_j$, said other non-linear function CNLF being formed by a segment F(x) (where x is an independent variable) which is not constant when x is situated in an interval $(-x_{min}, x_{max})$, and by two segments $F(x)=F_{max}$ and $F(x)=-F_{min}$ when $x \geq x_{max}$ and $x \leq -x_{min}$, respectively,

- means for linearly combining the n applications $F(M_j)$ with synaptic coefficients $D_j$ in order to produce said results of the application of the approximative non-linear function ANLF.

Said activation function ANLF can thus be attractively calculated by another neural processor for which it suffices that the other non-linear function CNLF is simple, defined in a given interval which is limited by two saturation segments $-F_{min}, F_{max}$. In the interval $(-x_{min}, x_{max})$ F(x) can be chosen in relation to the non-linear function NLF for which an approximation ANLF is desired. In order to obtain an approximation of a sigmoid, the non-constant segment F(x) may be, for example a part of a function formed by a third-order polynomial or a ramp function. A transformation according to this third-order polynomial may be realised in hardware by means of a table which necessitates the storage of only a very limited number of values but still enable calculation of a non-linear function ANLF with a small step.

A ramp function is very advantageous, because it enables the omission of the table, the necessary hardware means thus being further reduced.

The choice of the function constituting the non-constant segment F(x) is not strictly related to the non-linear function NLF for which an approximation is desired. Thus, the choice of this segment may be governed mainly by its ease of implementation. The number and the values of the predetermined synaptic coefficients $H_j$ and $D_j$ enable an approximation of the non-linear function NLF with a precision that can be chosen as desired.

The invention enables the use of limited hardware for the calculation of the approximative non-linear function ANLF. Thus, this reduced hardware can be doubled for the implementation of the calculation of the derivative of the non-linear function ANLF. The function and its derivative are thus considered as two functions which are separately treated in the same manner.

The use of the ramp function enables execution of the calculation of the function ANLF and its derivative without doubling the hardware required; this is advantageous for a hardware realisation.

The calculation of the non-linear function ANLF and/or its derivative having been performed by means of neural-type means, these means can be combined with other neural means of the neural processor in order to reduce the hardware means in general.

Looking at the invention from another point of view, there is provided a data processing system functionally comprising a neural network having a unit for creating a neural potential on the basis of input data received by the unit, wherein the neural potential includes a sum of products, each respective one of the products involving a respective multiplication of a respective one of the input data by a respective synaptic coefficient. The neural network further comprises non-linear function means for applying a non-linear function to the neural potential to create a neuron output data. According to the invention, the non-linear function means functionally comprises a further neural network having a plurality of further units. Each respective one of the further units is operative to create a respective further product that involves multiplying the neural potential by a respective factor and for thereupon applying a respective further non-linear function to the further product to create a respective outcome. The non-linear function means also comprises combining means for linearly combining the respective outcomes to provide a value of the first mentioned non-linear function associated with said neural potential.

Again, the further non-linear functions and the operations typical of neural nets (sum of products) create the first mentioned non-linear function. The simplicity of the non-linear function means and its structural similarity to a neural net renders the invention highly attractive for implementation in a neural net, in particular in a single chip neural net. Preferably, each further non-linear functions consists of a ramp between two saturation values.

Apart from the merits the invention has within the field of neural nets, this way of creating of a non-linear transfer function using a plurality of non-linear basic functions is clearly interesting to the field of more general non-linear controllers, wherein input signals and output signals are interrelated in a non-linear fashion. An example-is a fuzzy controller whose operation is based on fuzzy logic. Usually the non-linear transfer function is implemented with a look-up table, as calculations may require to much processing time.

Therefore, the invention also relates to a data processing system comprising non-linear function means to implement a non-linear transfer function operating on an input signal to create an output signal. According to the invention, the non-linear function means functionally comprises basic means to apply a plurality of respective basic non-linear functions to the input signal for creating respective outcomes; and combining means to linearly combine the respective outcomes for producing the output signal.

BRIEF DESCRIPTION OF THE DRAWINGS

The invention will be described in detail hereinafter by way of example and with reference to the accompanying drawings wherein.

DESCRIPTION OF EMBODIMENTS

Figure 1:
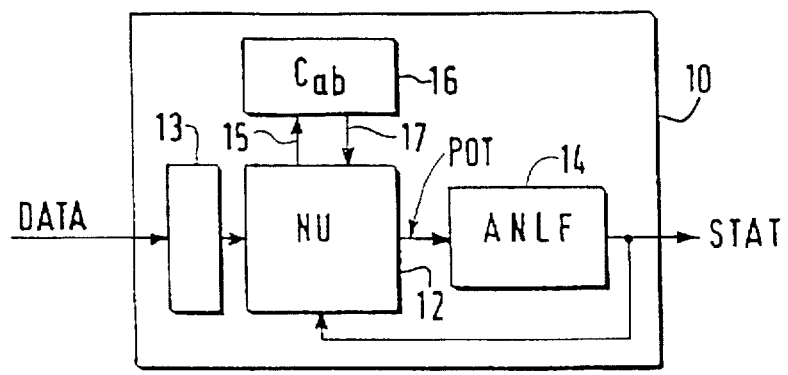
FIG. 1 shows a general diagram of a known neural processor.

FIG. 1 is a diagrammatic representation of a known neural processor 10, comprising a neural unit 12 which supplies at least a neural potential POT at a given instant. The neural unit 12 receives data $V_b$ from input means 13 and synaptic coefficients $C_{ab}$ from means 16, and calculates the neural potentials as follows:

$$POT_a = \sum_b C_{ab} \cdot V_b \qquad (i)$$

Depending on the nature of the relevant technical applications, the neural unit 12 may have several neurons for which a neural potential POT is determined at a given instant. If a time sequence is considered, for the same neuron a sequence of neural potentials POT appears. These potentials should in general be individually subjected to a non-linear activation function NLF. When the calculation thereof is performed in the neural processor, a non-linear activation function ANLF approximating the non-linear activation function NLF can be applied (block 14). A neural potential POT is thus transformed into a neural state STAT which, for a majority of neurons, is re-introduced into the neural unit 12 during the processing.

The synaptic coefficients $C_{ab}$ are stored in a memory 16. They characterize the connections which connect elements "b" to elements "a". These may be either inputs for the data $V_b$ of the means 13 or neurons of the neural unit 12.

During a learning phase, the synaptic coefficients are loaded (connection 15) into the memory 16. During a resolving phase, the synaptic coefficients are read (connection 17) in the memory 16.

The structure and the operation of such a neural digital processor are known to those skilled in the art.

Figure 2:
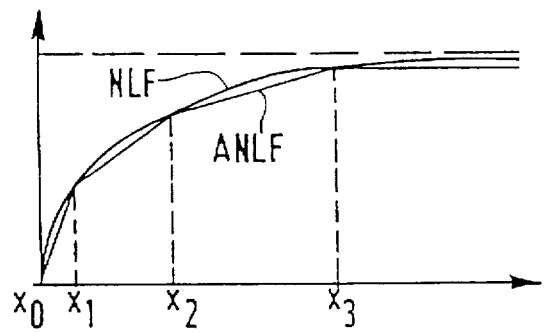
FIG. 2 shows a part of a sigmoid curve and its approximation by a segmented linear function (in a first quadrant)
Figure 3:
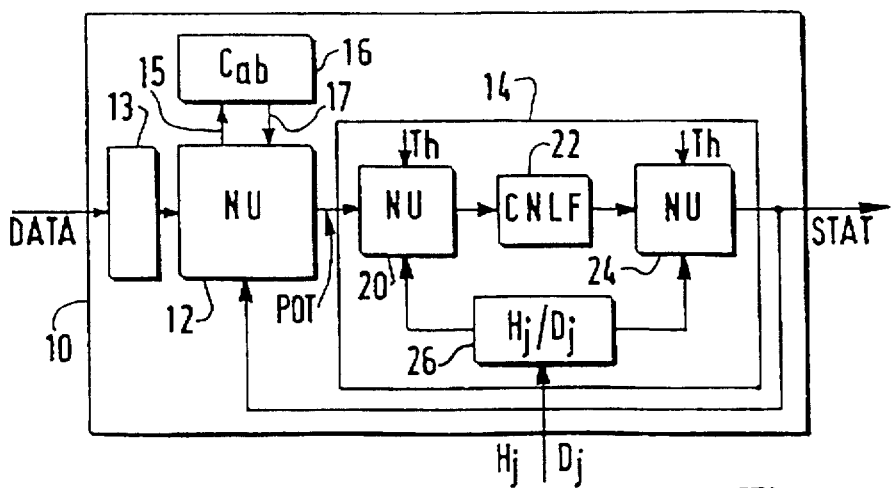
FIG. 3 shows a general diagram of a neural processor in accordance with the invention.

A non-linear function ANLF approximating a sigmoid (NLF) is shown in FIG. 2. By way of example, an odd function NLF will be considered for which a non-linear, equally odd function ANLF will be determined. Thus, this corresponds to thresholds $T_h$ which are zero. It concerns an approximation by segments consisting of rectilinear segments between the abscissae $(x_0, x_1)$, $(x_1, x_2)$, $(x_2, x_3)$, ... The invention proposes to execute an approximation of this kind by means of a neural digital processor 14 as shown in FIG. 3. It comprises an input neural unit 20, means 22 for applying another non-linear function CNLF, an output neural unit 24, and means 26 for storing synaptic coefficients $H_j$ and $D_j$ for the neural units 20 and 24, respectively. The input neural unit 20 receives data (neural potentials POT) from the neural unit 12 of the neural processor 10. The output neural unit 24 supplies a neural state STAT for each neural potential POT arriving at the input. In the case where the function NLF is not odd, the two neural units 20, 24 may receive thresholds $T_h$ which act on each neuron of the neural unit in order to modify the activation thresholds of the neurons.

Figure 4:
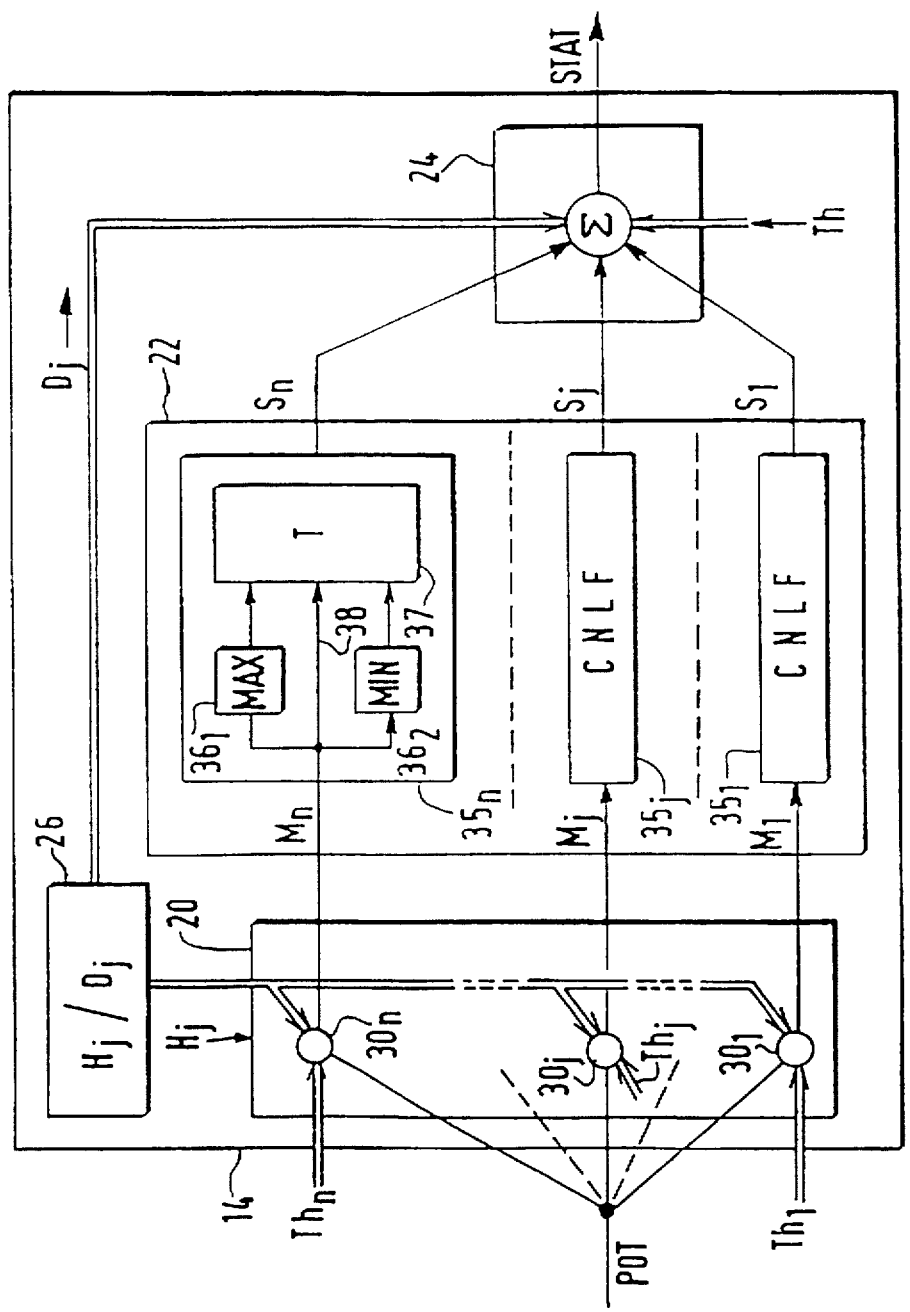
FIG. 4 shows a more detailed diagram of the other neural digital processor in accordance with the invention.

FIG. 4 shows a detailed diagram of a neural processor 14. The neural unit 20 comprises n neurons $30_1 \ldots 30_j \ldots 30_n$, each of which receives its own synaptic coefficient $H_1 \ldots H_j \ldots H_n$ and all of which receive the same neural potential POT which is to be subjected to the non-linear function ANLF. There are as many neurons as there are non-zero slope segments in the same quadrant for the approximative non-linear function ANLF. Each of the n neurons supplies a neural potential $M_1 \ldots M_j \ldots M_n$, where:

$$M_1 = H_1 \cdot POT + Th_1$$

$$M_j = H_j \cdot POT + Th_j$$

$$M_n = H_n \cdot POT + Th_n \qquad (ii)$$

where $Th_1 \ldots Th_j \ldots Th_n$ are zero when the function NLF is odd.

The n combinations $M_n$ can be obtained either via a layer of n neurons as already described, or via several layers of neurons which also supply n combinations. These neural potentials are subjected to the non-linear function CNLF.

The means 22 for applying the function CNLF are formed by units $35_1 \ldots 35_j \ldots 35_n$, each of which preferably applies the same function CNLF. A unit $35_n$ is formed, for example by two comparators $36_1$, $36_2$ which detect whether $M_n$ is greater than or equal to $x_{max}$ and smaller than or equal to $-x_{min}$, respectively. A table 37 is thus addressed either by the outputs of the comparators $36_1$, $36_2$ when they are active, or by $M_n$ when the comparators are not active. The table is loaded in advance with the values F(x), $F_{max}$ and $-F_{min}$. It is possible to use only a single unit 35 which successively operates on each potential $M_1, \ldots, M_j, \ldots, M_n$.

Figure 5:
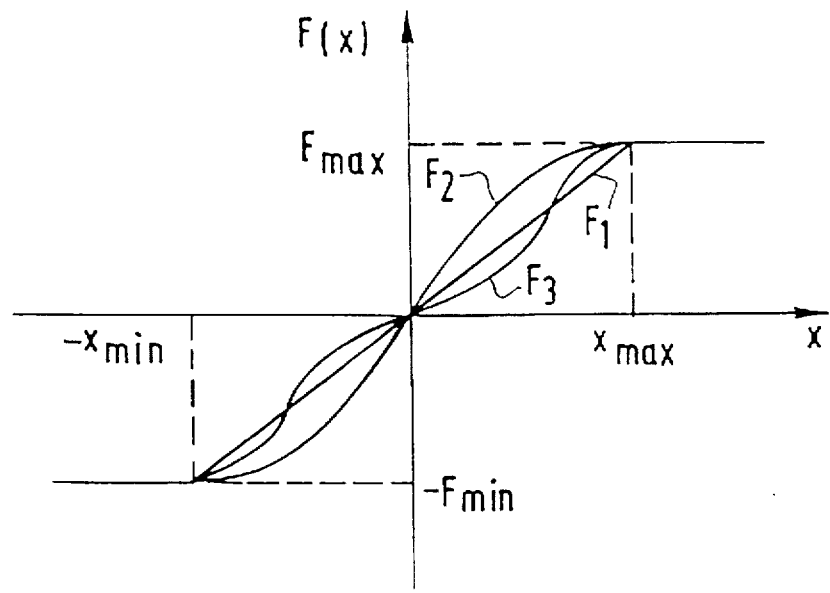
FIG. 5 shows different shapes of curves F(x) which can be used in accordance with the invention.

FIG. 5 shows examples of non-linear functions CNLF. Outside the interval $(-x_{min}, x_{max})$ all functions become saturated at $-F_{min}$ and $F_{max}$, respectively.

In the interval $(-x_{min}, x_{max})$, the function F(x) may be formed by a ramp (curve F1), or a third-order polynomial (curve F2) or a more complex curve (curve F3).

Preferably, in accordance with the invention a ram is used during the interval $(-x_{min}, x_{max})$. This function offers the advantage that it requires little hardware. It is an additional advantage that the associated calculation of its derivative necessitates only limited supplementary means.

Figure 6:
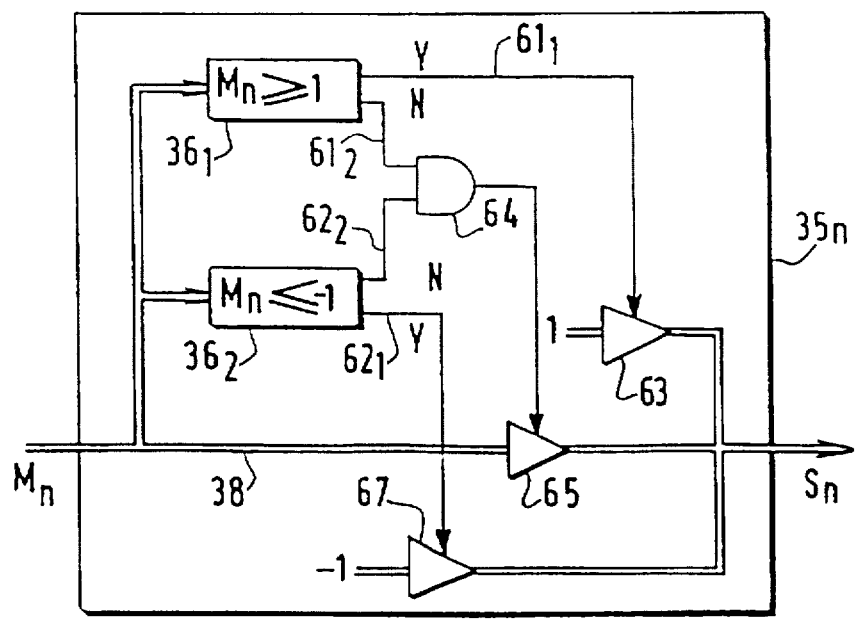
FIG. 6 shows a diagram relating to the case where the other non-linear function CNLF is a ramp.

FIG. 6 shows an embodiment of a unit 35, for example the unit $35_n$, in the case of the ramp for the n-order channel. In order to simplify the diagram, the values of $F_{max}$ and $-F_{min}$ are normalized to +1 and −1, respectively, as well as $x_{max}$ and $-x_{min}$.

The neural potential $M_n$ enters two comparators $36_1$, $36_2$ which detect whether $M_n \geq 1$ and $M_n \leq -1$, respectively.

When $M_n \geq 1$, the output $61_1$ is activated (state Y). It then activates a member 63 which impresses a value $F_{max} = +1$ on the output $S_n$n.

When $M_n \leq -1$, the output $62_1$ is activated (state Y). It then activates a member 67 which impresses a value $F_{min} = -1$ on the output $S_n$.

When $-1 < M_n < +1$, the outputs $61_2$ and $62_2$ are activated (state N). They are applied to an AND-gate 64 which acts on a transfer gate 65 which transfers each value $M_n$ (bus 38) on the output $S_n$. Correspondence thus exists between the neural potentials $M_n$ and the states $S_n$.

All units $35_1-35_n$ of FIG. 4 are identical when all potentials $M_j$ are subjected to the same function F(x). Different functions F(x) can be chosen. All states $(S_1-S_n)$ arrive, with the synaptic coefficients $D_j$, in the neural unit 24 (FIG. 4) which performs the following calculations:

$$STAT = \sum_{j=1}^{n} D_j \cdot S_j + th_j \qquad (iii)$$

The neural unit 24 is formed by a single neuron which is not necessarily followed by an activation function.

The coefficients $H_j$ and $D_j$ stored in the memory 26 so as to be used in the neural units 20 and 24, respectively, must be predetermined as a function of the choice of the non-linear functions NLF, ANLF and CNLF used and also of the approximation error accepted. When CNLF is a ramp, the calculation method is as follows.

DETERMINATION OF THE NON-LINEAR ACTIVATION FUNCTION ANLF

The non-linear function ANLF A(x) is an approximation of the non-linear function NLF T(x), x being an independent variable. Different criteria can be used for defining the function ANLF A(x):

- a first criterion may consist of defining an error E in advance which specifies an upper bound for the difference between the functions NLF and ANLF at the location x;
- a second criterion may consist of defining a number of segments in advance (i.e. the neural potentials $M_j$ supplied by the neural unit 20) desired for creating the approximation A(x) of the function NLF T(x).

In accordance with the first criterion, from the abscissa $x_o = 0$ (FIG. 2) there is plotted a straight slope $p_o$ and the abscissa $x_1$ is calculated for the point where said straight slope meets the curve of the function NLF, at the same time ensuring that the maximum error between the straight segment and said curve stays below the value E. The calculation is repeated for the point $x_1$ and so on for the entire curve of the function NLF. The calculation is terminated when the maximum error becomes smaller than the value E. Thus, there is obtained a sequence of straight segments which are defined by their slope and their extremities. The equation of a straight segment of the order k between $x_k$ and $X_{k+1}$ is:

$$A_k(x) = p_k x + q_k \qquad (iv)$$

where $p_k$ is the slope and $q_k$ is the ordinate at the origin.

Since A(x) and T(x) coincide at the extremities of the segments, one obtains:

$$p_k = \frac{T(x_{k+1}) - T(x_k)}{x_{k+1} - x_k} \text{ for } 0 \leq k \leq n-1, \qquad (v)$$

where $p_n = 0$ because the last segment has a slope zero and $$q_k = T(x_k) - p_k x_k \text{ for } 0 \leq k \leq n \qquad (vi)$$

The function T(x) is supposed to be convex (x>0) and odd. The calculation concerns values $x \geq 0$.

The error $e_k(x)$ between the two curves T(x) and A(x) is written as:

$$e_k(x) = T(x) - A(x) = T(x) - p_k x - q_k \qquad (vii)$$

The point $x = x_k^{max}$ where said error $e_k$ is maximum is defined by:

$$e'(x) = 0 \text{ or } T'(x_k^{max}) = p_k. \qquad (viii)$$

When a hyperbolic tangent function is taken for T(x), it appears that for the segments having a non-zero slope:

$$e_k^{max} = (1-p_k)^{1/2} - p_k \operatorname{arctanh}\{ (1-p_k)^{1/2} \} - q_k. \qquad (ix)$$

By proceeding successively with an increasing k, $x_k$ being known, and by writing that $e_k^{max}$ is equal to E, for each segment of the line of the order k its parameters $(x_{k+1}, p_k$ and $q_k)$ are obtained.

In accordance with the second criterion, a number of segments is fixed in advance. The extremities of segments are then determined for which the maximum errors for each segment, including that for the last segment, are strictly equal. The calculation method described for the first criterion can be slightly modified for the second criterion. This operation will be evident to those skilled in the art.

The precision of the approximation can be predetermined by fixing in advance either the value E of the maximum permissible error or the number of segments forming the function ANLF.

DETERMINATION OF SYNAPTIC COEFFICIENTS

When the approximative non-linear function ANLF has been determined, the synaptic coefficients $H_j$ and $D_j$, with $1 \leq j \leq n$, are still to be calculated. The number n of synaptic coefficients is preferably equal to the number of segments having a non-zero slope and constituting the function ANLF in the first quadrant. By making the extremities and the slopes of the segments correspond to the coefficients $H_j$ and $D_j$, in the case of a ramp a set of possible synaptic coefficients is:

$$H_j = \frac{1}{x_j} \text{ and } D_j = x_j (P_{j-1} - P_j) \text{ for } 1 \leq j \leq n. \qquad (x)$$

By way of example, in the case of an approxmation of a hyperbolic tangent function by 15 segments of a straight line with a non-linear function CNLF formed by a ramp, the following synaptic coefficients $H_j$ and $D_j$ have been calculated for a precision of 10 significant digits:

TABLE 1

| |
|---|
| 4.3929571045 |
| 2.6589252743 |
| 1.9717449409 |
| 1.5822224274 |
| 1.3228327984 |
| 1.1330240705 |
| 0.9850512198 |
| 0.8641723738 |
| 0.7616709701 |
| 0.6719071388 |
| 0.5908705654 |
| 0.5153201275 |
| 0.4420296760 |
| 0.3664545441 |
| 0.2772707979 |

TABLE 2

0.0159760715
0.0322265504
0.0470095161
0.0601030128
0.0713172192
0.0804814564
0.0874314814
0.0919985643
0.0939971737
0.0932077850
0.0893488436
0.0820245505
0.0706120016
0.0539566949
0.0288365201

Table 1 shows the synaptic coefficients $H_j$ and Table 2 shows the synaptic coefficients $D_j$.

The method described above is performed when the function CNLF comprises a ramp. The method can be applied analogously in the case where the function CNLF does not comprise a ramp but more complicated function parts.

DETERMINATION OF THE DERIVATIVE OF THE FUNCTION ANLF

During use of the neural processor 10 it may be necessary to apply learning algorithms which necessitate the availability of the derivative of the function ANLF.

A first solution is to consider this derivative as a new function and to perform its approximation as described above.

A second solution consists in utilizing the approach for the function ANLF so that ineffective duplication of given hardware means is avoided and also the calculation of an approximation of the derivative of the function ANLF can be dispensed with; to the contrary, the first exact derivative of the function ANLF is calculated instead. The ramp represents a particularly interesting case.

It has already been described that:

$$A(POT) = STAT = \sum_{j=1}^{n} D_j \cdot S_j = \sum_{j=1}^{n} D_j \cdot R(H_j \cdot POT) \quad \text{(xi)}$$

where $R(.)$ is the ramp function.

The derivative of the function ANLF is actually the calculation of the derivative of A, i.e.:

$$A'(POT) = \Sigma D_j H_j \cdot R'(H_j \cdot POT) \quad \text{(xii)}$$

The derivative of the ramp function R is written as:
when $POT \leq -1$ or $POT \geq 1$: $R'(.) = 0$
and when $-1 < POT < 1$: $R'(.) = 1$.

By comparing the equations (1) and (2) given above, it is found that the difference between the calculations of A(POT) and A'(POT) consists in the changing-over from the ramp function R to the function $H_j \cdot R'$.

Figure 7:
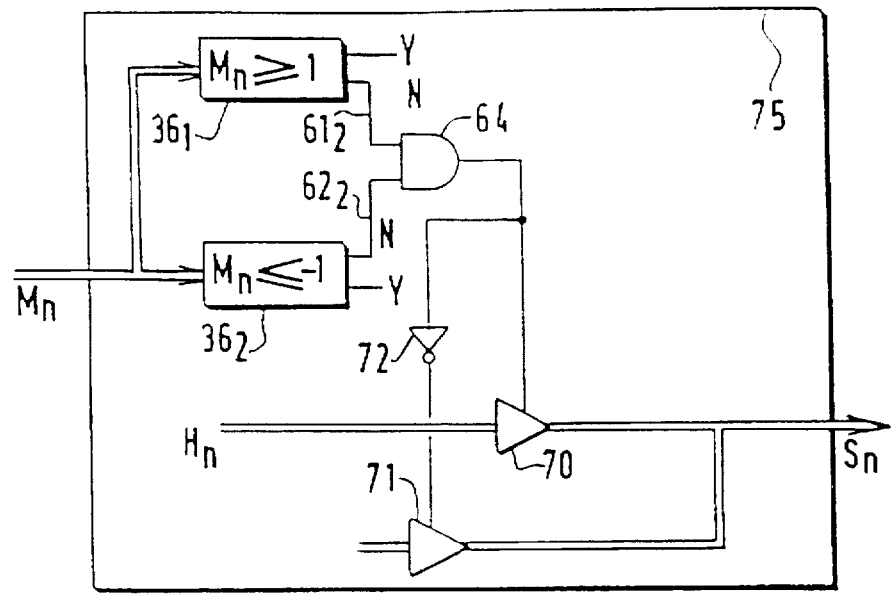
FIG. 7 shows a diagram for the calculation of the derivative of the function ANLF in the case where the other non-linear function CNLF is a ramp.

The calculation of the derivative can thus be performed by means of a configuration which is identical to that shown in FIG. 4, except for the blocks 35 which are shown in FIG. 7. The neural potentials $M_j$, $1 \leq j \leq n$, enter the comparators $36_1$, $36_2$ which detect whether $M_j \geq 1$ and $M_j \leq -1$. The outputs $61_2$ and $62_2$ are activated when $-1 < M_j < 1$. The outputs $61_2$, $62_2$ enter the AND-gate 64 which activates a transfer gate 70 which transfers the synaptic coefficient $H_j$ corresponding to the potential $M_j$ having the index j.

When the condition $-1 < M_j < 1$ is not verified, the AND-gate 64 activates an inverter 72 which controls an element 71 which impresses a signal zero on the output $S_j$.

Figure 8:
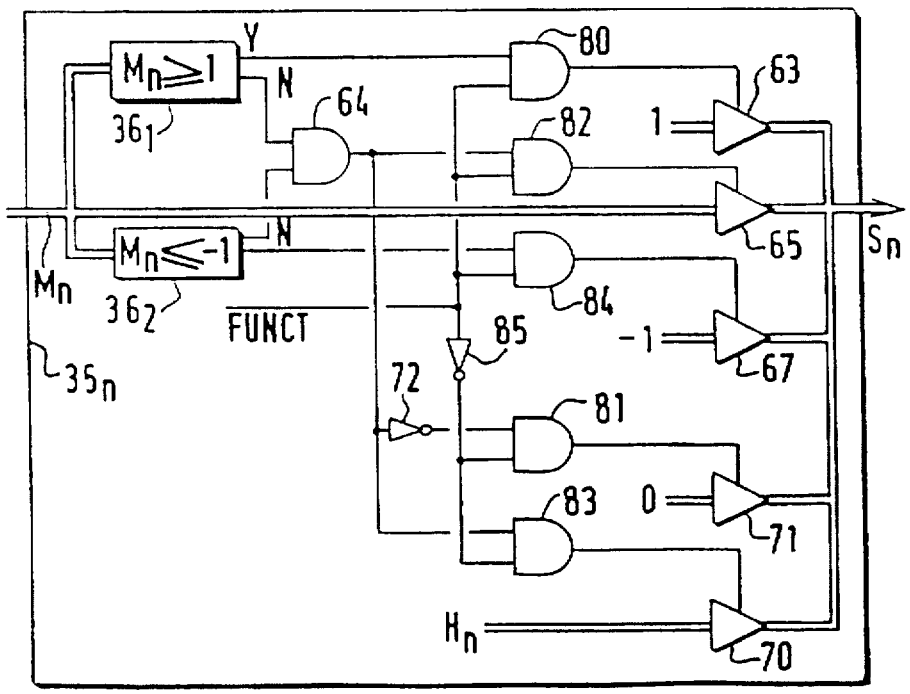
FIG. 8 shows a diagram for calculating the function ANLF and its derivative when the other non-linear function CNLF is a ramp.

The diagrams of the FIGS. 6 and 7 may be combined (FIG. 8) so as to be successively used either for the calculation of the function ANLF or for the calculation of its derivative. To this end, a function signal FUNCT enables selection of one mode or the other.

When the signal FUNCT is activated, it activates AND-gates 80, 82, 84 which control the previously described blocks 63, 65, 67.

A non-activated signal FUNCT thus constitutes a command for the calculation of the derivative. This signal is applied to an inverter 85 which activates AND-gates 81, 83 which control the previously-described blocks 70, 71.

Thus, a compact block 35 is obtained which enables calculation of either the function ANLF or the exact first derivative of the function ANLF. The approximation of the function NLF by the function ANLF can be obtained with a predetermined precision which is as high as desired.

The derivative function can also be calculated in a different way. As has already been described, the transfer gate 70 (FIGS. 7 and 8) serves to propagate the values of the coefficients $H_j$. An identical result can be obtained by setting the input of the gate 70 to a value 1 and by multiplying the states $S_j$ by the synaptic coefficients $D_j$ and by the synaptic coefficients $H_j$ (j being constant). This is realised, for example by storing synaptic coefficients $D_j \cdot H_j$ in the memory 26 (FIG. 3). It is advantageous that thus the architecture of the blocks 22 is thus attractively not modified for changing over from the calculation of the function F, using the synaptic coefficients $H_j$ and $D_j$, to the calculation of its derivative F' with the synaptic coefficients $H_j$ and $D_j \cdot H_j$.

The other neural processor 14 shown in FIG. 4 may be formed by hardware means which are independent of the other means of the neural processor 10 (FIG. 1). However, it is attractive to realise the other neural processor 14 on the basis of the neural unit 12 and the memory 16 of the neural processor 10. Actually, the calculation of the neural potentials POT and the application of the activation function constitute separate operations in time. Neurons of the neural unit 12 may thus be involved in the calculation of the neural potentials POT during a first period, after which they can be used for the calculation of the neural states STAT by application of the non-linear function ANLF.

EXAMPLE OF CONSTRUCTING A NON-LINEAR FUNCTION

Actually, the invention provides, within the context of neural nets, an elegant manner to construct a non-linear transfer function (essential to the operation of a neural net) by means of a linear combination of plurality of simple functions.

The construction of a non-linear transfer function A using basic functions S is shown in more detail in FIGS. 9–12 by way of example.

Figure 9:
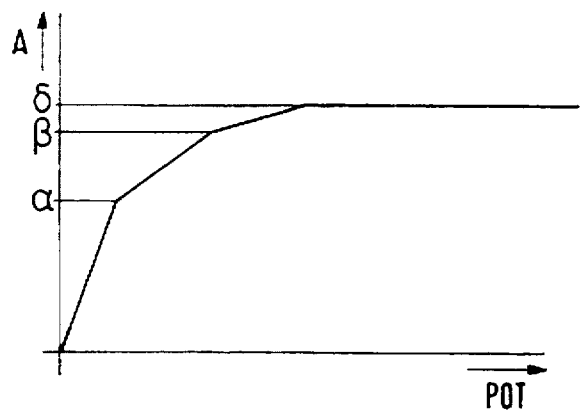
FIGS. 9–12 illustrate the formation of a non-linear transfer function using non-linear basic functions each having a ramp between two saturation values.

It is assumed in this example that the non-linear transfer function A is a piece-wise linear function consisting of a plurality of line segments. Transfer function A is considered to be an approximation of an odd sigmoid function as is usually employed in neural net operation. Transfer function A operates on the neural potential POT that includes the sum of the respective input signals to a particular neuron that are weighted by respective synaptic coefficients. The diagram of FIG. 9 illustrates the positive part of A, showing it to contain four linear segments with kinks at $\alpha$, $\beta$ and $\delta$.

Figure 10:
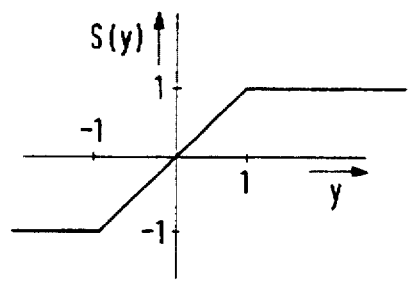

It is further assumed that as a basic function S there is available the following function:

$$S(y)=-1, \text{ for } y<-1;$$
$$S(y)=y, \text{ for } -1\leq |y|\leq 1;$$
$$S(y)=1, \text{ for } y>1; \quad \text{(xiv)}$$

as illustrated in the diagram of FIG. 10.

First, there are created 3 linear functions $M_j$, $1\leq j\leq 3$ operating on POT:

$$M_j=H_j POT, \quad 1\leq j\leq 3. \quad \text{(xv)}$$

Figure 11:
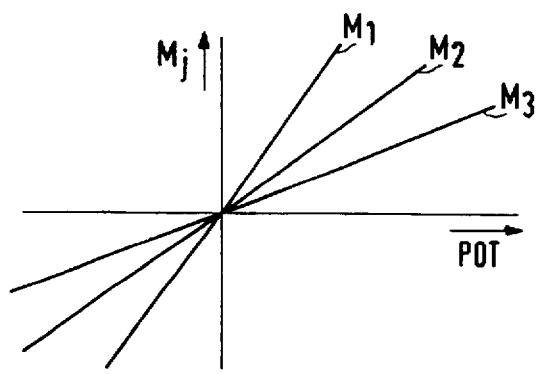

This is shown in the diagram of FIG. 11. The $H_j$ are predetermined constants as will be clarified below.

Figure 12:
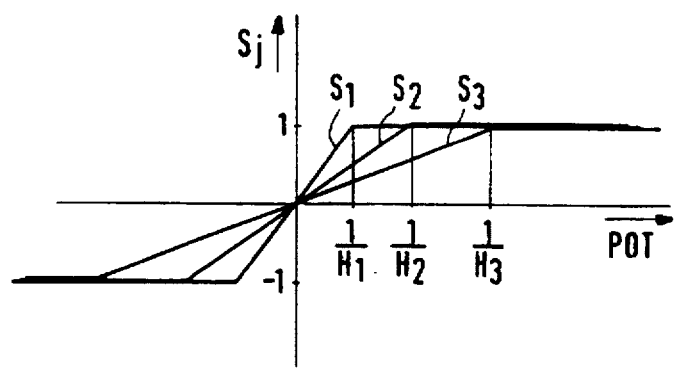

Next, the basic function S operates on each $M_j$ producing an $S_j$, still being a function of POT:

$$S_j=S(M_j), \quad 1\leq j\leq 3; \quad \text{(xvi)}$$

as shown in the diagram of FIG. 12. These three $S_j$ are to be suitably combined to give the non-linear function A of FIG. 9. That is, in the following expression (xvii) the factors $D_1$, $D_2$ and $D_3$ are to be chosen such that it equals the function A:

$$D_1 S_1(POT)+D_2 S_2(POT)+D_3 S_3(Pot)=A(POT) \quad \text{(xvii)}$$

Now note that beyond POT=1/$H_j$ basic function $S_j$ remains equal to unity and that $H_1>H_2>H_3$. Consequently, the contribution of $S_j$ to A(POT) beyond that value for POT remains constant. Beyond POT=1/$H_3$ the contributions of the $S_j$ are constant. For 1/$H_2 \leq$ POT $\leq$ 1/$H_3$ the contributions of $S_1$ and $S_2$ are constant, whereas $S_3$ provides a linearly varying contribution to A. For 1/$H_1 \leq$ POT $\leq$ 1/$H_2$ the contributions of $S_2$ and $S_3$ vary linearly, and $S_1$ is constant. For $0\leq$ POT $\leq 1/H_1$ the contributions of $S_1$, $S_2$ and $S_3$ all vary linearly.

Accordingly, the following equations hold good:

$$A(1/H_3)=\delta=D_1+D_2+D_3$$
$$A(1/H_2)=\beta=D_1+D_2+D_3\{H_3/H_2\}$$
$$A(1/H_1)=\alpha=D_1+D_2\{H_2/H_1\}+D_3\{H_3/H_1\} \quad \text{(xviii)}$$

Since the 1/$H_j$ correspond with the values of POT for which transfer function A has kinks ($\alpha$, $\beta$ and $\delta$) and are mutually different, the $D_j$ can readily be determined from this set of three linear equations involving three unknowns.

What has been shown now, is that a suitable combination of basic functions $S_j$ can be used to create a predetermined non-linear transfer function A.

The practical upshot is that the M an the S functions can readily be implemented by using a fairly simple neural net functionality in order to provide the non-linear function operation for a more intricate neural net.

Note that the non-linear function means (14) and neural processor (10) may be integrated together on the same chip. Note also that non-linear function means (14) may have neuron units ($30_1$–$30_n$) that functionally form parts of neural processor (10), since the operation cycle for these units as part of neural processor (10) precedes the operation cycle for these units as part of non-linear function means (14).

Note that the above construction of a non-linear function of a high complexity-level is not limited to neural nets, but may as well be applied to the field of non-linear controllers that use non-linear transfer functions as essential operations. For example, such a controller receives input data that specify the current state of the system to be controlled and supplies control data to guide the system towards the desired status. The control data generally depend in a non-linear way on the input data, especially when the system to be controlled moves in a parameter region far away from the desired state, e.g., equilibrium. To implement the non-linear transfer function, the non-linear controller itself may include a simple neural net for producing the piece-wise linear transfer function using a linear combination of simple functions.

Although above discussion mainly concerned a digital approach, the invention may also be implemented in analog circuitry. It is to be noted, however, that the accuracy of analog circuitry performing above calculations may be restricted owing to noise-susceptibility or parameter spread.

What is claimed is:

1. A neural digital processor (10), comprising:
   a. an input (13) for receiving digital data and generating an output signal.
   b. a neural unit (12) coupled to the input for calculating neural potentials, from the output signal, according to a function of the output signal and synaptic coefficients, said synaptic coefficients are weight connections either between neurons or between neurons and the input.
   c. memory (16) for storing said synaptic coefficients.
   d. means (14) for subjecting at least one of the neural potentials, designated POT, to at least one approximative non-linear activation function ANLF which is formed by n segments in order to produce at least one neural state, said means (14) comprising another neural digital processor which comprises:
      I. means (20) for calculating n combinations, $M_j=H_j \cdot POT+Th_j$, where
         n is an integer;
         j is an integer such that $1\leq j\leq n$;
         $H_j$ are predetermined synaptic coefficients; and
         $Th_j$ are thresholds.
      II. means (22) for calculating states $S_j=F(M_j)$, using another non-linear function CNLF which is formed by
         A. a segment F(x), where x is a running independent variable, which segment is not constant when x is situated in an interval $(-x_{min}, x_{max})$, and
         B. two segments $F(x)=F_{max}$ and $F(x)=-F_{min}$ when $x\geq x_{max}$ and $x\leq -x_{min}$, respectively.
      III. means (24) for linearly combining the states with further synaptic coefficients $D_j$ in order to produce said at least one neural state STAT.

2. A processor as claimed in claim 1, wherein the means (22) for calculating the states comprises:
   means ($36_1$, $36_2$, 64) for detecting whether the combinations $M_j$ are situated within the interval $(-x_{min}, x_{max})$ or outside this interval.
   means (37) for calculating the states in this interval, and
   means (37) for assigning, to the states, values $F_{max}$ and $-F_{min}$, respectively, when $M_j \geq x_{max}$ and $M_j \leq -x_{min}$, respectively.

3. A processor as claimed in claim 2, wherein the means (37) comprises a table which stores predetermined values $F(M_j)$ at addresses $M_j$.

4. A processor as claimed in claim 2, wherein
   said other non-linear function CNLF is a ramp, and
   the means (37) comprises transfer means (38,65) that apply the potential values $M_j$ to the states $S_j$.

5. A processor as claimed in claim 1, wherein the other neural digital processor also comprises means (75) for calculating a derivative F' of the non-linear activation function ANLF.

6. A processor as claimed in claim 5, wherein the means (75) comprises at least one table which stores predetermined values of the states $S'_j=F(M_j)$ when the combinations $M_j$ are situated within the interval $(-x_{min}, x_{max})$ and a value zero outside said interval.

7. A processor as claimed in claim 5, wherein said other non-linear function CNLF is a ramp, the means (75) comprises a block (70) that copies, for each state $S'_j=F(M_j)$, value of the corresponding synaptic coefficient $H_j$.

8. A processor as claimed in claim 5, wherein said other non-linear function CNLF is a ramp, the means (26) stores values $H_j$ and $D_j$, for the calculation of the non-linear function ANLF, and values $H_j$ and $D_j \cdot H_j$ for the derivative of the non-linear function ANLF, and the means (75) comprises a block (70) whose inputs receive data of unit value.

9. A processor as claimed in claim 1, wherein the means (22) is used for successively calculating applications according to the non-linear function ANLF and according to ANLF's derivative.

10. A processor as claimed in claim 1, wherein the neural unit (12) and the other neural processor (14) have common neurons.

11. A data processing system comprising a neural network comprising:

a. a unit for creating a neural potential from input data received by the unit, wherein the neural potential represents a sum of products, each respective one of the products resulting from a respective multiplication of a respective one of the input data by a respective synaptic coefficient;

b. non-linear function means for applying a non-linear function to the neural potential to create neuron output data, the non-linear function means comprising:

I. a plurality of further units, each respective one of the further units being for A. supplying a respective further product resulting from multiplying the neural potential by a respective factor; and B. applying a respective further non-linear function to the further product to create a respective outcome; and II. combining means for linearly combining the respective outcomes to provide a value of the first non-linear function associated with said neural potential said neural potential being an intermediate signal within a single neuron function whose external signal output is said neuron output data.

12. The system of claim 11, wherein each of said respective further non-linear functions comprises a respective ramp between two saturation values.

13. The system of claim 11 integrated in a single IC device.

14. A non-linear function device for use in creating at least one neuron output in a neural network processor, the device comprising:

a. means for receiving a neural potential signal which results from the sum of the products of a plurality of respective synaptic coefficients to a plurality of respective neuron input signals, which neural potential signal is an intermediate signal within a same neuron function as the at least one neuron output;

b. a plurality of means for sequentially applying a plurality of respective basic transfer functions to the neural potential signal for creating respective intermediate outcomes; and c. combining means for linearly combining the respective outcomes to produce at least one non-linear output signal, said at least one non-linear output signal being an output of the at least one neuron.

15. A neural digital processor comprising:

a. input means for receiving digital data;

b. first means for storing a first plurality of synaptic coefficients;

c. a first neural unit for applying the first plurality of synaptic coefficients to an output signal of the input means, according to a stored neuron configuration to create at least one neural potential signal;

d. means for applying at least one respective first non-linear function to each of the at least one neural potential signal to create at least one respective neuron output, said means for applying at least one first non-linear function comprising another neural digital processor coupled to the first neural unit, said other neural digital processor comprising:

I. second means for storing a second plurality of synaptic coefficients;

II. a second neural unit for applying the second plurality of synaptic coefficients to the output signal of the first neural unit; and III. means for applying at least one second non-linear function to an output signal of the second neural unit, said at least one second non-linear function being simpler than the non-linear function, wherein each of the at least one neural potential signal is an intermediate signal within a respective single neuron function whose ultimate output is created by the means for applying at least one first respective non-linear function.

16. The processor of claim 15 further comprising feedback means coupling the means for applying at least one first non-linear function and the first neural unit, so that the at least one first non-linear function is iteratively appliable to realize neuron outputs of successive layers of the stored neuron configuration.

17. The processor of claim 15, wherein each of the at least one second non-linear function is a respective ramp.

* * * * *